United States Patent
Amro et al.

(10) Patent No.: US 6,715,056 B1
(45) Date of Patent: Mar. 30, 2004

(54) NETWORK DOCUMENT TRANSMISSION TO RECEIVING DISPLAY STATIONS WITH AUTOMATIC SIZING OF RECEIVED DOCUMENT CACHES BASED UPON USER ACTIVITY IN PRIOR BROWSING SESSIONS

(75) Inventors: Hatim Yousef Amro, Austin, TX (US); John Paul Dodson, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 718 days.

(21) Appl. No.: 09/070,039

(22) Filed: Apr. 30, 1998

(51) Int. Cl.[7] .................................................. G06F 12/00
(52) U.S. Cl. ...................... 711/171; 711/118; 711/113; 709/224; 709/226
(58) Field of Search ................................. 711/118, 170, 711/171, 104, 112, 113, 154, 156, 172; 707/205; 709/203, 223, 224, 226

(56) References Cited

U.S. PATENT DOCUMENTS

| | | | |
|---|---|---|---|
| 4,399,503 A | 8/1983 | Hawley | 711/113 |
| 5,257,370 A | 10/1993 | Letwin | 711/113 |
| 5,572,643 A | 11/1996 | Judson | 709/218 |
| 5,596,744 A | 1/1997 | Dao et al. | 707/10 |
| 5,625,781 A | 4/1997 | Cline et al. | 345/335 |
| 5,651,136 A * | 7/1997 | Denton et al. | 711/118 |
| 5,706,467 A * | 1/1998 | Vishlitzky et al. | 711/129 |
| 5,752,255 A * | 5/1998 | Jarvis | 711/3 |
| 5,826,031 A * | 10/1998 | Nielsen | 709/233 |

* cited by examiner

Primary Examiner—Matthew Kim
Assistant Examiner—M. D. Anderson
(74) Attorney, Agent, or Firm—Leslie A. Van Leeuwen; J. B. Kraft

(57) ABSTRACT

A data processor controlled user interactive display system for displaying hypertext documents, each including a sequence of display screen pages received at a receiving display station from a communications network such as the World Wide Web. Automatic sizing of the cache for received pages at the receiving display station is provided. This cache includes portions of the station's disk storage means and random access memory means for storing data representative of received screen pages. The size of the portions of disk storage and random access storage means needed for the cache are determined by prior monitoring of the quantities of disk storage and of random access memory used in said cache during prior transmission of screen pages to said receiving display station. The size of portions of disk storage and random access memory allocated to the present cache are based upon said prior monitoring. These sizing functions are most effectively included in a network interactive browser.

14 Claims, 4 Drawing Sheets

NETWORK DOCUMENT TRANSMISSION TO RECEIVING DISPLAY STATIONS WITH AUTOMATIC SIZING OF RECEIVED DOCUMENT CACHES BASED UPON USER ACTIVITY IN PRIOR BROWSING SESSIONS

TECHNICAL FIELD

The present invention relates to computer managed communication networks and particularly to ease of use interactive computer controlled display interfaces to networks such as the Internet. More particularly, the invention relates to the caching of received document pages or Web pages received at a receiving display station on the network.

BACKGROUND OF THE INVENTION

The 1990's have been marked by a technological revolution driven by the convergence of the data processing industry with the consumer electronics industry. Like all such revolutions, it unleashed a significant ripple effect of technological waves. The effect has, in turn, driven technologies which have been known and available but relatively quiescent over the years. A major one of these technologies is the internet-related distribution of documents, media and programs. The convergence of the electronic entertainment and consumer industries with data processing exponentially accelerated the demand for wide ranging communication distribution channels, and the World Wide Web or Internet which had quietly existed for over a generation as a loose academic and government data distribution facility reached "critical mass" and commenced a period of phenomenal expansion. With this expansion, businesses and consumers have direct access to all matter of documents, media and computer programs. As a result of these changes, it seems as if virtually all aspects of human endeavor in the industrialized world require human-computer interfaces. Thus, there is a need to make computer directed activities accessible to a substantial portion of the world's population which, up to a year or two ago, was computer-illiterate, or, at best, computer indifferent. The challenge of our technology is to create display interfaces to computers and particularly to Internet which are intuitive and forgive any impreciseness on the part of users.

With all of these rapidly expanding functions of Web pages and like documentation, it should be readily understandable that the demand for Web documents has been expanding exponentially in recent years. World Wide Web pages are now extensively used for commercial, academic and entertainment purposes. In addition, because of the vast amount of information potentially available through networks such as the internet, it is important that the presentation of the pages of a transmitted document be presented as quickly as possible on the display screen of the receiving display station and with as little effort as possible on the part of the receiving user. To this end, the Internet browser programs through which these users access the Internet are provided with caching capabilities at the receiving display station.

At this point, in order to better understand the factors associated with browsers and caching, a brief review of the current Internet background should be helpful. The most commonly used method of accessing and distributing data over the Internet is through the World Wide Web (WWW) environment commonly known as the "Web".

In the Web environment, servers and clients conduct Web transactions using the Hypertext Transfer Protocol (HTP), a common protocol for handling the transfer of various data files (e.g. text, still graphic images, audio, motion video, etc.). Information is formatted for transfer and presentation to a user by a standard page description language (Hypertext Markup Language (HTML)). Besides formatting, HTML allows developers to specify "links" to other Web resources identified by a Uniform Resource Locator (URL). The URL defines a communication path to an Internet server containing specific logic blocks of information known as Web pages. Web pages may be of any arbitrary size and may include text, graphics, forms for making queries to databases on the server etc. A Web page may include all files required to present the information requested by using the URL identifier, including text/HTML files, graphics files and audio files.

Retrieval from the Web is accomplished with the above-mentioned browser which is an HTML compatible application program for submitting requests for data through a URL submitted by the receiving or client display station. When such data is retrieved, the controlling Web browsers cache pages accessed at the receiving display station. Network bandwidths are finite and the time required to retrieve a Web page depends on the number of servers at the site from which the Web page is being retrieved, the connection speeds and line widths. Also, Web pages often include large graphic files requiring a substantial amount of transfer time from the source to the requesting display station. Furthermore, caching of pages permits the user to repeatedly view the information within a session without also repeatedly retrieving such information from the Internet. The Web pages and pages of other documents retrieved from the Internet cached in the local memory at the receiving display station, usually in cache portions allocated in the local disk drive and in the local random access memory (RAM). Most conventional Internet browsers have programming routines for evaluating incoming documents and allocating local disk drive storage and RAM for the document cache at the receiving display station. Such evaluations and allocations are based in part on the type and size of the files of data supporting the displayed pages. In addition, received files often contain control code indicative of cache size requirements which may be used by the browser to allocate disk drive storage and RAM portions for caching. However, all of these cache allocation procedures presuppose that the user in setting up the browser has set aside sufficient disk drive portions and RAM portions for such caches. For example, let us assume that the browser application using control information provided by an incoming Web page has determined that the document will require a cache having m megabytes of disk space and n megabytes of RAM. However, as it turns out, the user in setting up the browser application has set aside less that the n megabytes of RAM. The browser will attempt to load the document in the RAM cache, since there will be insufficient RAM cache available, the document will be loaded in the noncache portion of RAM. This will, of course, subvert the purpose of the cache in that the document will not be cached to speed up the subsequent document loading, etc.

Conventionally, many browser programs ask the user during set up to specify the quantity of RAM and the quantity of disk drive storage that he wishes to set aside for cache. Since a major portion of Internet and other network access terminal users are relatively unsophisticated in computer arts, this presents difficulties to such users.

The present invention offers a solution to this problem by tracking the prior activity of the user in network accessing, and uses this activity to automatically set aside appropriate RAM and disk drive storage for caching. This concept should be distinguished from automatic cache size determining systems such as that described in U.S. Pat. No. 5,257,370, which tracks the usage of specific files and then stores along with the file control code indicative of the size of disk cache needed to most optimally handle the particular file.

SUMMARY OF THE INVENTION

The present invention relates to a computer controlled display system for displaying documents, and particularly for displaying Web pages and related documentation on receiving display workstations in a computer managed communication network. Users access these Web pages via a plurality of data processor controlled interactive display stations, which receive documents transmitted to said display stations from locations remote from said stations. Such documents include a sequence of at least one display screen page containing text and images. The present invention provides for the automatic sizing of the cache for received pages at the receiving display station. This cache includes portions of the station's disk storage means and RAM means for storing data representative of received screen pages.

The receiving display station also includes means for determining the size of the portions of disk storage means and of the random access storage means for said cache which comprises means for monitoring the quantities of disk storage and of RAM used in said cache during prior transmission of screen pages to said receiving display station, and means for sizing the portions of disk storage and RAM allocated to the present cache based upon said monitoring. These sizing means are most effectively included in a network interactive browser.

The period of prior transmission over which the quantities of disk storage and RAM used in the cache is monitored is preferably one session. Although what constitutes a session will vary from user to user, let us consider one session to be period from which the user enters the Internet and explores several sites in a relatively continuous manner. The session period would be terminated by either the user getting off the Internet or interrupting his browsing for a substantial period of time. Of course, the period of sampling the size of prior caches may be shorter or longer than the previous session.

DETAILED DESCRIPTION OF THE PREFERRED EMBODIMENT

Before going into the details of specific embodiments, it will be helpful to understand from a more general perspective the various elements and methods which may be related to the present invention. Since a major aspect of the present invention is directed to documents such as Web pages transmitted over networks, an understanding of networks and their operating principles would be helpful. We will not go into great detail in describing the networks to which the present invention is applicable since this information is well known in our art. Reference has also been made to the applicability of the present invention to a global network such as the Internet. For details on Internet nodes, objects and links, reference is made to the text, *Mastering the Internet*, G. H. Cady et al., published by Sybex Inc. Alameda, Calif., 1996.

Any data communication system which interconnects or links computer controlled systems with various sites defines a communications network. A network may be as simple as two linked computers or it may be any combination of LANS (Local Area Networks) or WANS (Wide Area Networks). Of course, the Internet or World Wide Web is a global network of a heterogeneous mix of computer technologies and operating systems. Higher level objects are linked to the lower level objects in the hierarchy through a variety of network server computers. These network servers are the key to network distribution, such as the distribution of Web pages and related documentation. The HTML language, which is the basic language of Web pages, is described in detail in "Just Java", 2nd Edition, Peter van der Linden, Sun Microsystems, 1997, particularly at Chapter 7, pp. 249–268; and also in the text, "Mastering the Internet", Cady et al., published by Sybex, San Francisco, 1996, particularly at pp. 637–642 on HTML in the formation of Web pages. In addition, significant aspects of this invention will involve Web browsers. A general and comprehensive description of browsers may be found in the above-mentioned Cady et al. text at pp. 291–313.

Figure 1:
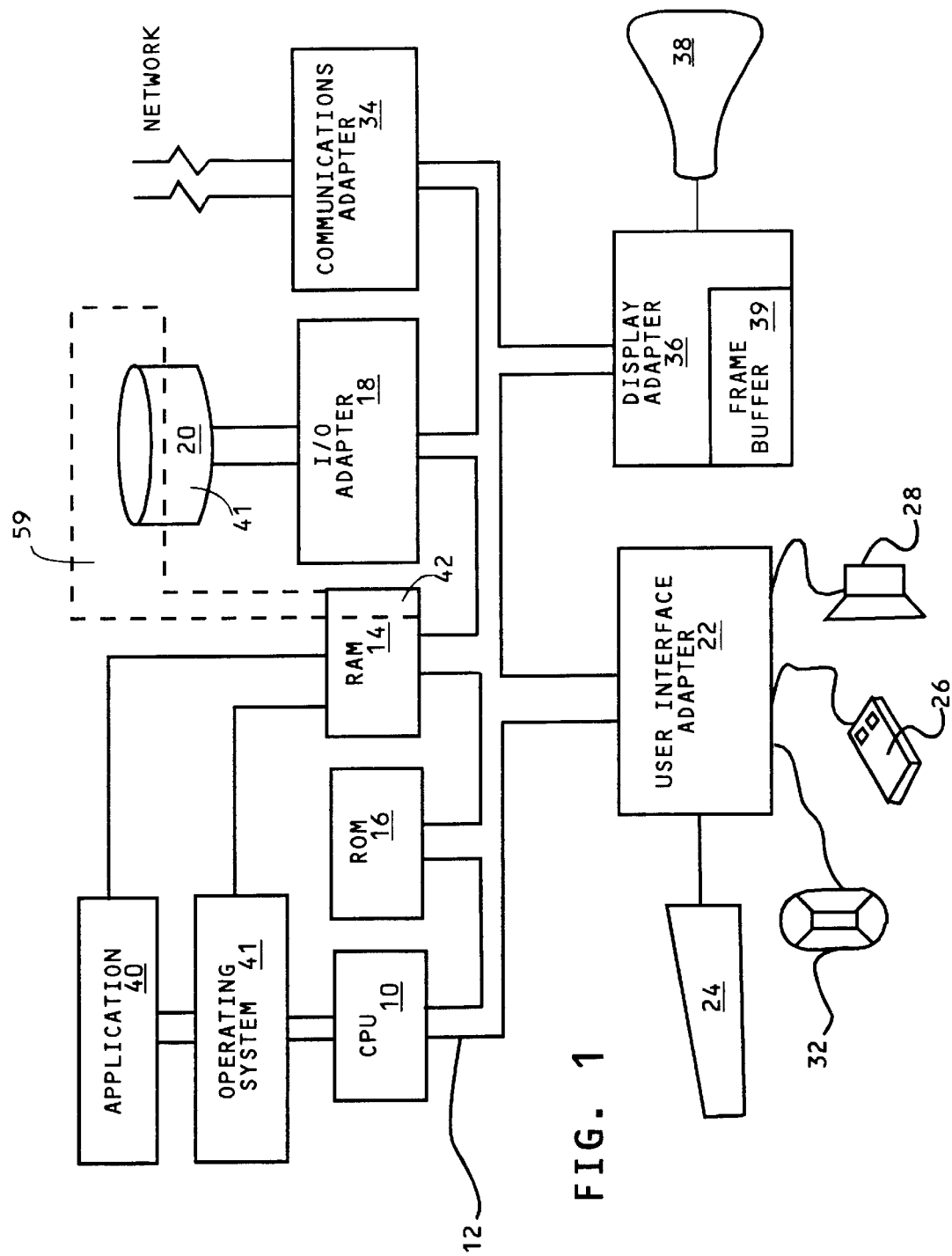
FIG. 1 is a block diagram of a data processing system including a central processing unit including a network browser and cache and with network connections via a communications adapter which is capable of implementing a user interactive receiving display station on which the received pages may be cached in caches sized in accordance with the present invention.

Referring to FIG. 1, a typical data processing system is shown which may be used in conjunction with the program for the automatic sizing of document/page caches in implementing the present invention on the receiving interactive workstation. A central processing unit (CPU), such as one of the PC microprocessors available from International Business Machines Corporation, is provided and interconnected to various other components by system bus 12. An operating system 41 runs on CPU 10, provides control and is used to coordinate the function of the various components of FIG. 1. Operating system 41 may be one of the commercially available operating systems such as the OS/2 operating system available from International Business Machines Corporation (OS/2 is a trademark of International Business Machines Corporation) or the Windows95 (a trademark of and available from Microsoft Corporation) system, as well as UNIX or AIX operating systems. Any conventional network browser system modified, as will be described in accordance with present invention, forms part of application 40, runs in conjunction with operating system 41 and provides output calls to the operating system 41 which implements the various functions to be performed in the automatic document cache sizing, as well as the browser program which operates in combination with the program of the present invention.

A read only memory (ROM) 16 is connected to CPU 10, via bus 12 and includes the basic input/output system (BIOS) that controls the basic computer functions. RAM 14, I/O adapter 18 and communications adapter 34 are also interconnected to system bus 12. It should be noted that software components including the operating system 41 and browser, including the cache sizing functions of this invention, are part of the applications 40, are loaded into RAM 14, which is the computer system's main memory. I/O adapter 18 may be a small computer system interface (SCSI) adapter that communicates with the disk storage device 20, i.e. a hard drive. Communications adapter 34 interconnects bus 12 with an outside network enabling the workstation to communicate with Web servers to receive document pages over a LAN or WAN, which includes, of course, the Internet or World Wide Web. I/O devices are also connected to system bus 12 via user interface adapter 22 and display adapter 36. Keyboard 24, trackball 32 and mouse 26 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting data and other information to the system through the trackball 32 or mouse 26 via display 38. Cache 59, which is variable and sized in accordance with the present invention, is illustrated as a dashed line outline and includes a portion 41 of disk drive 20 and a portion 42 of RAM 14.

Figure 2:
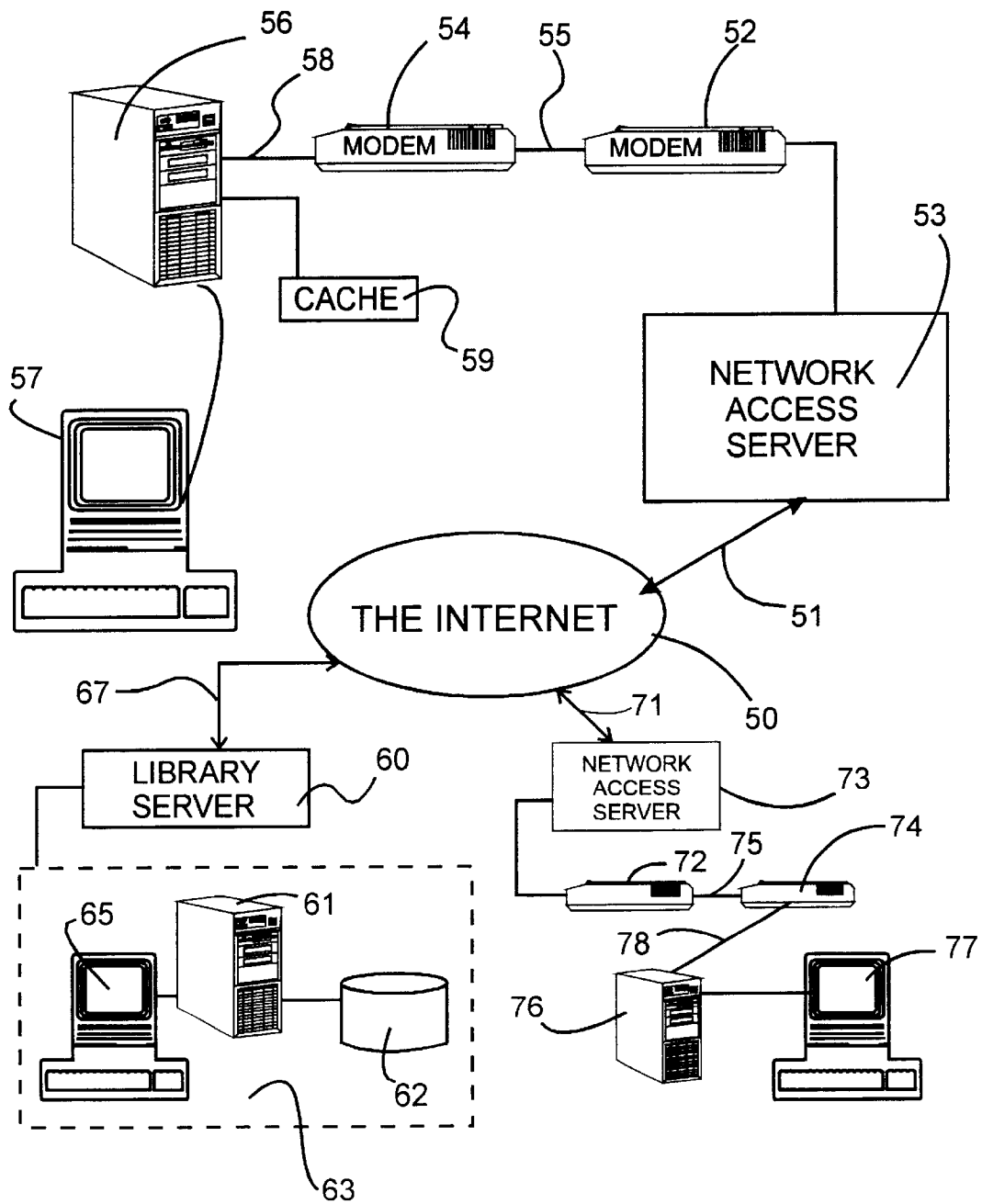
FIG. 2 is a generalized diagrammatic view of an Internet portion upon which the present invention may be implemented.

A generalized diagram of a portion of an Internet, which the computer 56 controlled display terminal 57 used for Web page or other document display of the present invention, is connected as shown in FIG. 2. Computer 56 and display terminal 57 are the computer system shown in FIG. 1 and connection 58 (FIG. 2) is the network connection shown in FIG. 1. Reference may be made to the above-mentioned Cady et al. text, particularly pp. 136–147, for typical connections between local display workstations to the Internet via network servers, any of which may be used to implement the system on which this invention is used. The system embodiment of FIG. 2 is one known as a host-dial connection. Such host-dial connections have been in use for over 30 years through network access servers 53 which are linked 51 to the net 50. The servers 53 are maintained by a service provider to the client's display terminal 57. The host's server 53 is accessed by the client terminal 57 through a normal dial-up telephone linkage 58 via modem 54, telephone line 55 and modem 52. The HTML files representative of the Web pages are downloaded to display terminal 57 through controlling server 53 and computer 56 via the telephone line linkages from server 53 which may have accessed them from the Internet 50 via linkage 51. In accordance with the present invention, cache 59 is connected with computer 56 and is made up of a portion of disk drive 20 and of RAM 14 as illustrated in FIG. 1. The user at display terminal 57 is receiving the Web pages, and the browser program on computer 56, as modified by the program of the present invention, is providing for user access to such pages including the automatic page cache size determination of this invention, as will be hereinafter described with respect to FIGS. 3 and 4.

The present invention is preferably implemented on the net browser in combination with standard browser functions. Now with respect to FIG. 3, there will be described, through the flowchart, how the present invention may be practiced on a display station with an appropriate browser program which may be modified as described to practice the present invention.

Now with respect to FIG. 3, there will be described a procedure for tracking the sizes of the RAM and disk drive caches during a typical user browsing session so that the sizes of such caches during the browsing session may be used to size these caches during subsequent browsing sessions. The present invention is preferably implemented on any conventional net browser in which the size tracking modification is implemented in combination with standard browser functions. A graphical user interface is provided within the browser through which the user requests the Web pages and other documents which he requires during a Web browsing session. Then the browser will control the functions to be subsequently described. The value of the present invention is based on the observation that the nature and scope of a browsing session is likely to be personal to the particular user and is determined by the needs, interests and habits of the particular user at or about the time of the browsing session. Thus, if we track the extent of any browsing function of the particular user just before a current session, it is very likely that the level or value of that function will be about the same for the current function. This principle is applicable to sizing the RAM caches and disk drive storage caches used for expediting the display of pages and documents which the browser pulls off the Internet during a browsing session. All commercial browsers already have built-in routines for determining the optimum extent of caching in both RAM and disk drive storage for the particular documents/pages obtained from the Internet. These are often dependent upon control code information included in the documents. However, it is also conventional for the browser programs to request the user to designate the sizes of RAM cache and disk drive cache that he selects to allocate. While a relative few Internet users have enough sophistication to analyze their storage resources and needs and make appropriate allocations to such caches, the typical Internet user is not so sophisticated. It is to that user that the present invention is directed.

Figure 3:
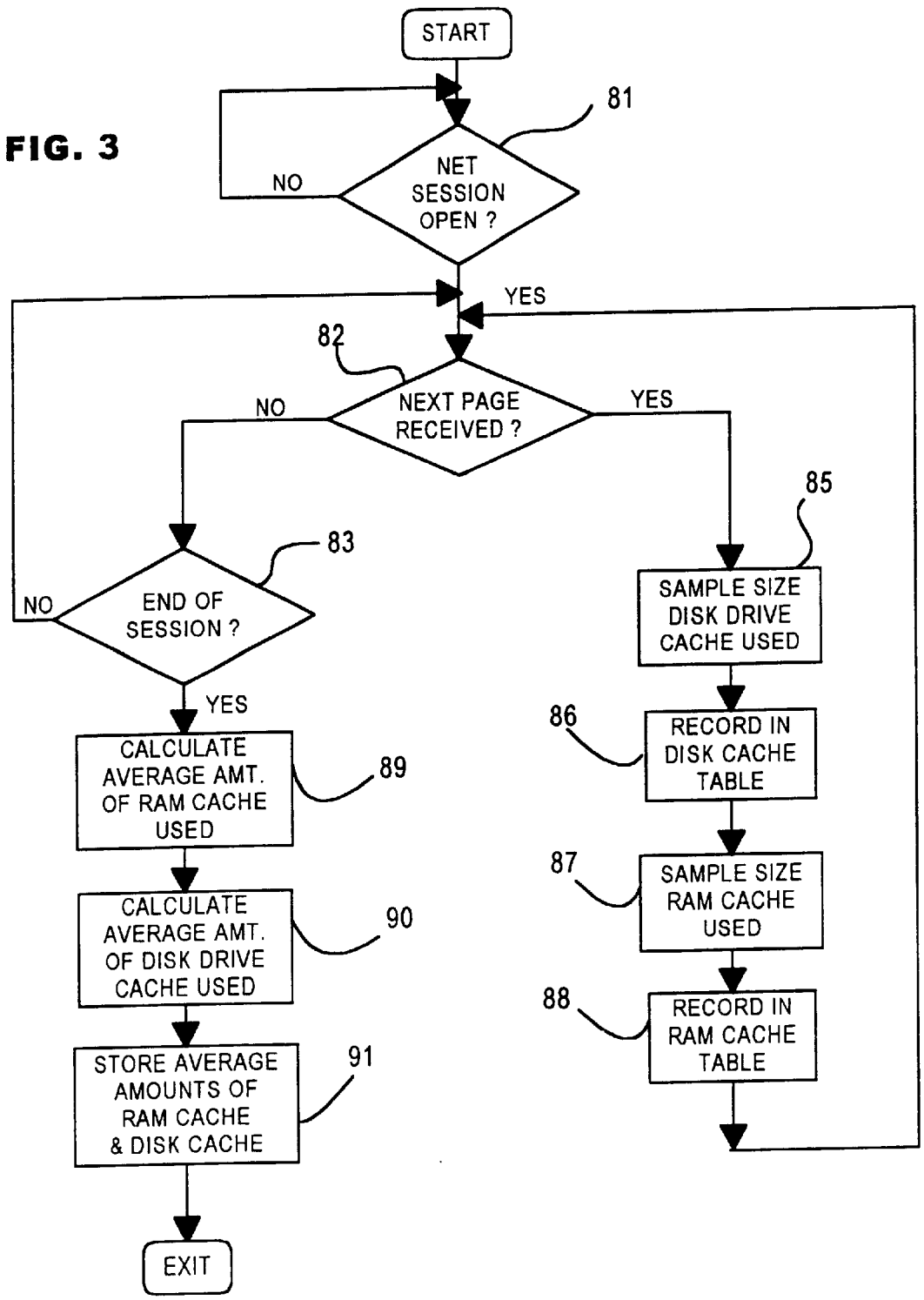
FIG. 3 is a flowchart of a program which may be used at a receiving display station of received Web documents to track the sizing of caches during prior browsing sessions in order to size caches during subsequent sessions.

In the tracking process of FIG. 3, a determination is made, step 81, as to whether the Internet browsing session has been opened by the user. If No, the flow loops back to decision step 81 and the opening of the session is awaited. Let us assume that a session is opened by a user. For simplicity of this description, a session will be considered to be the period through which the user opens, browses through the Internet and then terminates the browsing session. Thus, upon opening, the decision from step 81 will be Yes and we will proceed to step 82 wherein a determination is made as to whether a next page has been received, which at this point will be the initial page. If yes, then the cache sizes used in the browser presenting this page will be tracked. It should be recognized that during the browsing process being described, other procedures may be going on with respect to received documents and pages, but we are only following the cache sizes. Accordingly, the process then goes to step 85 where the size of the disk drive cache used in dealing with this page is sampled and then stored in a table of disk drive cache values, step 86. Correspondingly, step 87, the size of the RAM cache is sampled and then stored in a table of RAM cache values, step 88. The process then loops back to step 82 and the same procedure is used to sample for each page the respective values of disk drive caches and RAM caches and these values are respectively stored in disk drive and RAM cache tables. This will continue until the last page in the session has been received and processed, at which point the decision from decision step 82 will be No and a determination will be made in decision step 83 as to whether the session has ended. If No, i.e. the user is obtaining more pages in other documents, then the flow returns to step 82 where the next page is awaited. However, if there are no more documents with pages and the session is over, then, step 89, the RAM cache values stored in the above-mentioned tables for each page are averaged to a calculated value of RAM cache used and, step 90, the disk drive cache values stored in the above-mentioned tables for each page are averaged to a calculated value of disk drive cache used. These average cache values are stored for the next browsing session, step 91, and the routine is exited.

Figure 4:
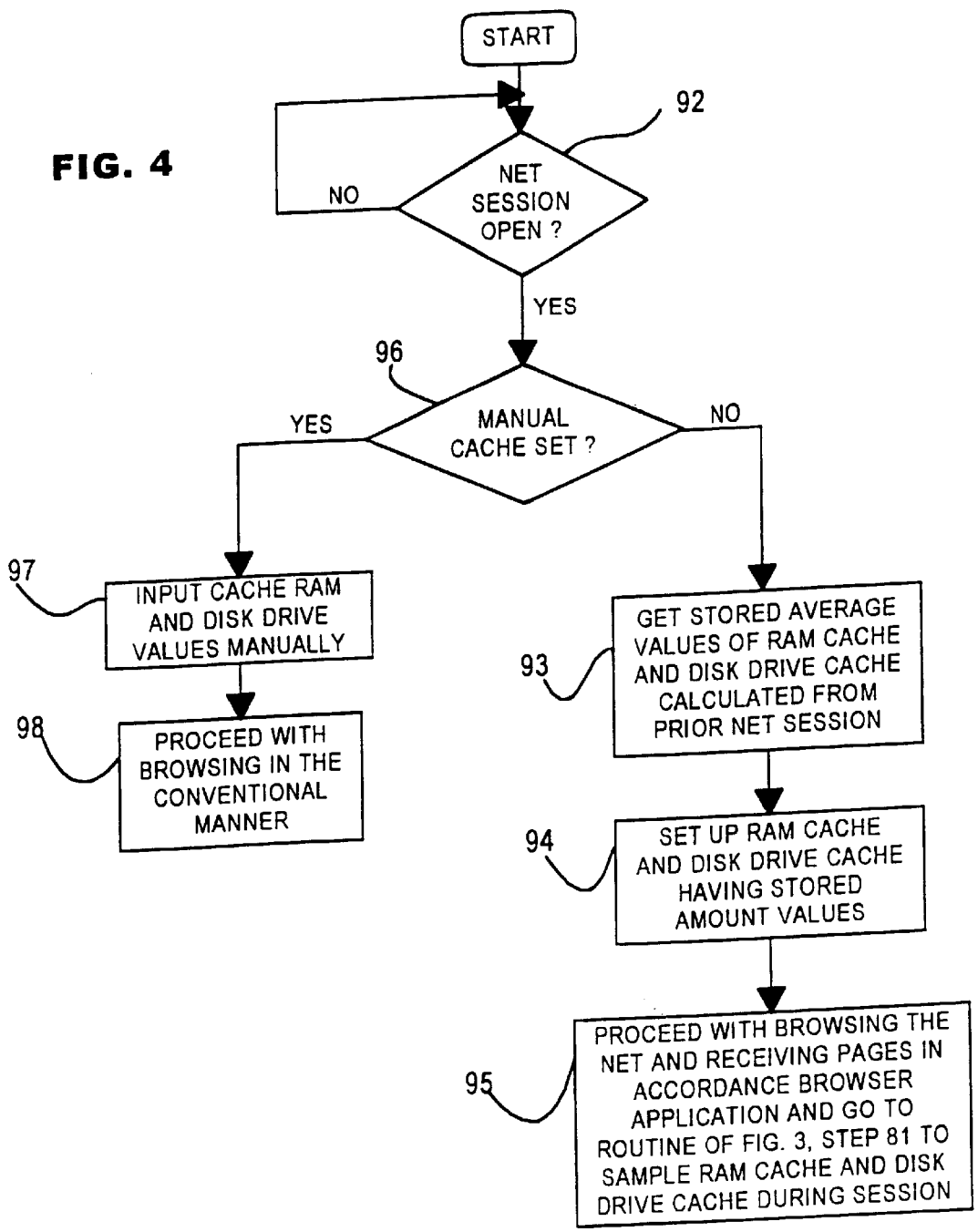
FIG. 4 is a flowchart setting forth some general procedures in a browsing session in the option when the user chooses to manually set the cache sizing and when he chooses the automatic cache sizes developed by the method of FIG. 3.

Now with respect to FIG. 4, there will be described how the sizes of the disk drive cache and RAM cache calculated in a prior session, as described in FIG. 3, may be used to allocate such caches in the next browsing session. A determination is made as to whether the net browsing session has been opened, step 92. If Yes, then a determination is made, step 96, as to whether the user has chosen to manually set the RAM cache and disk drive storage cache sizes for the session in the conventional manner. If Yes, then the flow proceeds to step 97 where the input sizes of the caches are allocated in the standard manner, and the browsing proceeds in the conventional manner, step 98. On the other hand, if a manual cache size input has not been made in step 96, then the system proceeds in accordance with the present invention, step 93, to get the stored average size values of RAM cache and disk drive cache as stored in step 91, FIG. 3, in prior session, and then to set up RAM cache and disk drive caches of these stored sizes, step 94. Then, as set forth in step 95, the browsing session proceeds in accordance with the user requests, but the amounts of the allocated caches which are actually used in the session are again tracked commencing with step 81, FIG. 3, to be used in the next session. In this manner, RAM cache and disk drive cache sizes to be allocated may be continuously and dynamically updated from session to session.

Although certain preferred embodiments have been shown and described, it will be understood that many changes and modifications may be made therein without departing from the scope and intent of the appended claims.

What is claimed is:

1. In a computer managed communications network with user access via a plurality of data processor controlled interactive receiving display stations and with a system for displaying documents transmitted to said display stations from locations remote from said stations, said documents including a sequence of at least one display screen page including images, the improvement comprising:

at least one of said receiving display stations including disk storage means, random access memory means and a cache including portions of said disk storage means and said random access memory means for storing data representative of received screen pages; and means for determining the size of said portions of disk storage means and said random access storage means for said cache comprising;

means for monitoring the quantities of disk storage and of random access memory used in said cache during prior transmission of screen pages to said at least one receiving display station, and means for sizing the portions of disk storage and random access memory allocated to the present cache based upon said monitoring.

2. The communications network of claim 1 wherein said receiving display station further includes a user interactive network browser, said browser including said means for determining the size of said portions of disk storage means and said random access storage means for said cache.

3. The communications network of claim 2 wherein said network browser includes means for allocating the data representative of said received screen pages to said cache portions of said disk storage means and said cache portions of said random access storage means.

4. The communications network of claim 2 wherein said means for monitoring monitor said quantities during the prior transmission of at least one document having a plurality of screen pages.

5. The communications network of claim 4 wherein said means for monitoring monitor said quantities for a period of one session.

6. In a computer managed communication network with user access via a plurality of data processor controlled interactive display stations and with a system for displaying documents transmitted to said display stations from locations remote from said stations, said documents including a sequence of at least one display page containing text and images, a method for sizing disk storage and random access memory allocated for caching data representative of received screen pages in a receiving display station comprising:

monitoring the quantities of disk storage and of random access memory used in said cache during prior transmission of screen pages to said receiving display station, and sizing the portions of disk storage and random access memory allocated to the present cache based upon said monitoring.

7. The method of claim 6 further including a network browsing method carried out in said receiving display station, said browsing method including said step of determining the size of said portions of disk storage means and said random access storage means for said cache.

8. The method of claim 7 wherein said network browsing method includes the steps of allocating the data representative of said received screen pages to said cache portions of said disk storage means and said cache portions of said random access storage means.

9. The method of claim 7 wherein said monitoring of said quantities is during the prior transmission of at least one document having a plurality of screen pages.

10. The method of claim 9 wherein said monitoring step is carried out for a period of one session.

11. In a computer program having program code included on a computer readable medium for browsing a computer managed communication network via a data processor controlled user interactive receiving display station including disk storage means and random access memory in order to display on said receiving display station, documents transmitted to said station from network locations remote from said receiving station, each document including a sequence of at least one display screen page containing text and images, the improvement comprising:

means for determining the size of portions of disk storage means and random access storage means to be allocated as a cache for storing data representative of said received page comprising;

means for monitoring the quantities of disk storage and of random access memory used in said cache during prior transmission of screen pages to said receiving display station; and means for sizing the portions of disk storage and random access memory allocated to the present cache based upon said monitoring.

12. The computer program for browsing according to claim 11 further including means for allocating the data representative of said received screen pages to said cache portions of said disk storage means and said cache portions of said random access storage means.

13. The computer program of claim 11 wherein said means for monitoring monitor said quantities during the prior transmission of at least one document having a plurality of screen pages.

14. The computer program of claim 13 wherein said means for monitoring monitor said quantities for a period of one session.

* * * * *